(12) United States Patent
Shkolnikov et al.

(10) Patent No.: US 12,480,086 B2
(45) Date of Patent: *Nov. 25, 2025

(54) CHEMICAL LYSIS SYSTEMS

(71) Applicant: Hewlett-Packard Development Company, L.P., Spring, TX (US)

(72) Inventors: Viktor Shkolnikov, Palo Alto, CA (US); Alexander Govyadinov, Corvallis, OR (US); Diane R. Hammerstad, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 944 days.

This patent is subject to a terminal disclaimer.

(21) Appl. No.: 17/417,339

(22) PCT Filed: Feb. 1, 2019

(86) PCT No.: PCT/US2019/016372
§ 371 (c)(1),
(2) Date: Jun. 22, 2021

(87) PCT Pub. No.: WO2020/159545
PCT Pub. Date: Aug. 6, 2020

(65) Prior Publication Data
US 2022/0073863 A1     Mar. 10, 2022

(51) Int. Cl.
*C12M 1/00*     (2006.01)
*C12M 1/42*     (2006.01)
*C12M 3/06*     (2006.01)

(52) U.S. Cl.
CPC ............ *C12M 47/06* (2013.01); *C12M 23/16* (2013.01); *C12M 35/08* (2013.01)

(58) Field of Classification Search
None
See application file for complete search history.

(56) References Cited

U.S. PATENT DOCUMENTS 6,586,253 B1    7/2003    Harrison et al.
9,580,679 B2    2/2017    Njoroge et al.
(Continued)

FOREIGN PATENT DOCUMENTS

CA     2817775 A1    11/2014
DE     69900623 T2    6/2002
(Continued)

OTHER PUBLICATIONS

Kim Y C et al.: "Microfluidic biomechanical device for compressive cell stimulation and lysis", Sensors and Actuators B: Chemical, p. 108-116 v. 128, No. 1, Jun. 14, 2007.
(Continued)

*Primary Examiner* — William H. Beisner
(74) *Attorney, Agent, or Firm* — Foley & Lardner LLP

(57) ABSTRACT

In one example in accordance with the present disclosure, a chemical lysis system is described. The chemical lysis system includes a microfluidic channel to serially feed individual cells from a volume of cells to at least one chemical lysing device. Each chemical lysing device includes at least one lysing chamber to receive, from the microfluidic channel, a single cell to be lysed. The chemical lysing device also includes an orifice disposed in each lysing chamber to receive a lysing agent and a sensor to detect a state within the lysing chamber. A controller of the chemical lysis system analyzes a ruptured cell.

7 Claims, 11 Drawing Sheets

(56) References Cited

U.S. PATENT DOCUMENTS

| | | | |
|---|---|---|---|
| 9,926,552 B2 | 3/2018 | Craighead et al. | |
| 11,801,509 B2 * | 10/2023 | Shkolnikov | C12M 23/16 |
| 2003/0075446 A1 | 4/2003 | Culbertson et al. | |
| 2005/0053952 A1 | 3/2005 | Hong et al. | |
| 2010/0297754 A1 | 11/2010 | Solli et al. | |
| 2011/0312545 A1 | 12/2011 | Silverbook et al. | |
| 2014/0087374 A1 | 3/2014 | Kayyem | |
| 2017/0259257 A1 | 9/2017 | Singer | |

FOREIGN PATENT DOCUMENTS

| | | |
|---|---|---|
| DE | 102009028493 A1 | 2/2011 |
| EP | 1359415 A1 | 11/2003 |
| EP | 3070160 A1 | 9/2016 |
| WO | WO-2008075275 A1 | 6/2008 |
| WO | WO-2017184178 | 10/2017 |
| WO | WO-2017205267 A1 | 11/2017 |

OTHER PUBLICATIONS

Hoefemann, Henning, et al. "Sorting and lysis of single cells by BubbleJet technology." Sensors and Actuators B: Chemical 168 (2012): 442-445.

\* cited by examiner

CHEMICAL LYSIS SYSTEMS

BACKGROUND

Cell lysis is a process of rupturing the cell membrane to extract intracellular components for purposes such as purifying the components, retrieving deoxyribonucleic acid (DNA), ribonucleic acid (RNA), proteins, polypeptides, metabolites, or other small molecules contained therein, and analyzing the components for genetic and/or disease characteristics. Cell lysis bursts a cell's membrane and frees the cell's inner components. The fluid containing the cell's inner components is referred to as lysate.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
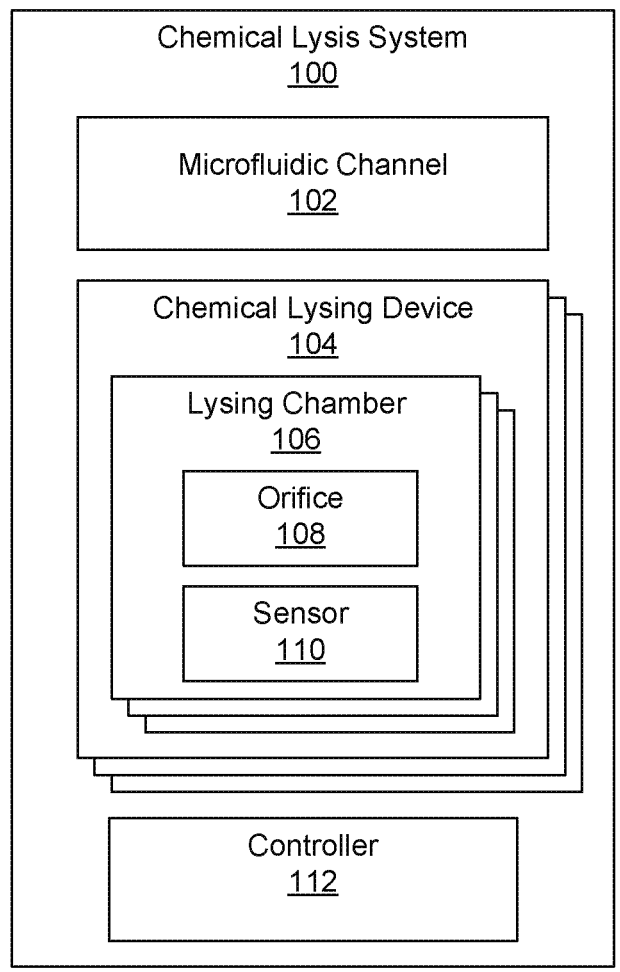
FIG. 1 is a block diagram of a chemical lysis system, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Cell lysis is a process of extracting intracellular components for purposes such as purifying the components, retrieving DNA and RNA proteins, polypeptides, metabolites, and small molecules or other components therein, and analyzing the components for genetic and/or disease characteristics. Cell lysis ruptures a cell membrane and frees the inner components. The fluid containing the inner components is referred to as lysate. The contents of the cell can then be analyzed by a downstream system. Cell lysis can be executed using any number of methods.

In one example, high frequency sound waves shear the cell membranes, and the cell walls if present. Another example of lysis via shearing is to mill the cells against balls in a fluid. In yet another example, a pestle may be used to rupture the cell membranes. In still another example of shearing, rotating blades may grind the cell membranes. Other examples of lysis include localized heating which can cause cell denaturation and can cause certain cells to rupture. As yet another example, the cells may be forced through a narrow space, thereby shearing the cell membranes. In another example, repeated cycles of freezing and thawing can disrupt cells through ice crystal formation.

In the present system and method, a solution-based lysis operation is executed. In these examples, cell lysis may be carried out by changing the osmotic pressure within the cell. Changes in the osmotic pressure cause the cell to enlarge or collapse. If the change is of sufficient degree, the cell membrane may collapse or burst. In general, a small osmotic pressure difference is maintained across the cell membrane, and is balanced by an electrical force via ion transport channels (e.g. sodium pumps, potassium pumps, chloride pumps) in the cell membrane. In one example, to lyse the cell osmotically, the solution in which the cell bathes is changed so that the osmotic pressure drives water into the cell (the concentration of solute is higher inside the cell as compared to outside the cell or the ionic strength of the solution inside the cell is higher than the ionic strength outside the cell). This in turn causes expansion, and strain on the cell membrane, which upon reaching its yield point ruptures.

In another example, to lyse the cell osmotically, water is driven out of the cell by making the solution outside of the cell to have higher ionic strength then inside the cell. This causes the membrane to shrink and loose its function.

In yet another example, a cell may be osmotically lysed by interfering with the normal function with ion transport channels. For example, sodium pumps may be inhibited which may cause cells to shrink about the same amount as them being placed into a hyposmotic solution.

That is, according to the present system and method, the osmotic pressure in the cell could be increased or decreased to collapse the cell membrane or to cause the cell membrane to burst. For example, a hypertonic agent may be added to a solution with cells. The hypertonic agent causes the cells to take on water, swell, and subsequently burst. In another example, a hypotonic agent is added to the solution which forces water to flow out of the cell. This can cause the cell to shrink, shrivel, and/or rupture. Solution, or chemical, lysis may be a milder operation and simpler to execute as compared to physical lysis and therefore may be recommended in certain circumstances. Moreover, chemical lysis is easier to implement requiring less specialized components.

As cell lysis is part of many sample preparation protocols for the characterization of nucleic acid or protein contents of a cell, the quality of cell lysis can have a direct impact on downstream operations. For example, if the lysis has poor efficiency, the amount of material to be analyzed may be reduced. Poor lysis can also affect the analytic results as those cells that are not lysed are excluded from the analysis. On the other hand, if the lysis conditions are too harsh, the nucleic acid and/or protein material may deteriorate. Doing so similarly degrades the information that can be obtained from the sample.

To offset these potential issues, chemists may over-lyse a cell to ensure a high enough rate of lysis completion. In the specific example of chemical lysing, this may include exposing a cell to more than a necessary amount of a lysing agent. This may be too much for some cells and can lead to degradation of the biomaterials of interest. Moreover, using excessive agent is ineffective as a chemist may not know the exact moment when lysis is completed to a satisfactory level. Accordingly, extra resources and time are expended in an attempt to ensure that lysing is complete.

In addition to overexposing a cell, such lysing operations do not ensure complete lysis. For example, a chemist may use a predetermined amount of lysing agent to lyse the cells. In these cases, it may be assumed that all the operations in the preparation go as planned and just the final results, following the entire chemical analysis, are measured. However, such a system is ineffective and may be inaccurate as the procedural operations may not be executed as expected. That is, lysis may not have occurred.

Accordingly, the present specification describes a device, system, and method for addressing these and other issues. Specifically, the present specification describes a device for monitoring and controlling individual cell lysis by detecting and analyzing a change of the solution. That is, as the cell is lysed and contents therein are expelled, a change occurs within the cell. The moment this change occurs is recorded and used to analyze the cell.

Accordingly, the present device includes a small chamber (in some examples no more than 100× the volume of the cell) to hold a single cell to be lysed. The chamber includes an orifice through which a chemical lysing agent is added to lyse the cell.

Upon lysing, the content of the cell is released, which changes conditions within the chamber. For example, the total conductivity within the chamber may change. A sensor can detect this change of state and perform a variety of actions. For example, if no change occurs, the sensor can trigger a lysing agent distributor to eject more of the lysing agent. If a change has occurred, the sensor can trigger the passing of information related to the strength and quantity of lysing agent used to rupture the cell. This information may later be used to analyze the cell and/or the lysate.

In some examples, the chemical lysis system is included in a multi-function chip. That is, cellular analytics is a scientific field that uses instruments to separate, identify, and quantify cellular components. A wealth of information can be collected from a cellular sample. For example, the mechanical properties of the cell membrane and even more specifically, information relating to the mechanical breakdown of the cell membrane can provide insight to the characteristics and state of a cellular sample. The intracellular components of the cell, extracted via lysis, also provide valuable information about a cell.

However, in general it may be difficult to obtain a correlation between 1) the mechanical and chemical properties of a cell and 2) the genetic information of the cell. That is, a user cannot simultaneously get mechanical and genetic information from a single sample. To get both genomic and mechanical information, two different samples would be used. However, as the different samples may have different properties, any correlation between the separately collected genomic and mechanical information would rely on a similarity between the two samples, which similarity may not exist or may be tenuous.

Accordingly, a scientist may have to pick from between the two pieces of information (e.g., mechanical and genomic), which they would like to collect. It may be more desirable to obtain the genomic information from the cell as it provides more information and it may be possible to perform just one type of experiment. However as described above, the mechanical properties of a cell also provide valuable information.

Moreover, knowing the correlation between mechanical and genetic characteristics of a cell can have many advantages. For example, a correlation between genomic information and a cells susceptibility to lysis may allow a prediction of lytic antibiotic resistance of a cell based on the cell's genetic information. In another example, this correlation is relevant in situations where, for example, cell membrane properties play a role in disease pathology. Examples of such include cancer, where the elasticity of the circulating tumor cell is one of the determining factors of the cell's metastatic potential. Another example is malaria where parasitic infection of red blood cells changes the stiffness of the red blood cells and changes the transport of these cells through the circulatory system. Accordingly, both pieces of information, i.e., mechanical properties and genetic information, for a cell are valuable and useful in analytic chemistry.

Still further, as cell populations are heterogeneous, meaning each cell in a population may be different from others and may have different responses and characteristics. Accordingly, the correlation between mechanical and genetic information may also be heterogeneous. Accordingly, not only is it desirable to obtain both pieces of information, it may be desirable to obtain genomic and mechanical properties at a single cell level so as to remove inter-sample variation from any resulting correlation.

As a specific example, a sample, such as a blood sample, may include a number of different kinds of cells, each to perform different function and different in its physical and chemical makeup. This heterogeneity of a sample is a building block of the foundations of sustainable life. For example, the different cells in blood allow the blood to sustain human life. Accordingly, when a cell sample is analyzed, it may be desirable to individually analyze the cells in a population, specifically their nucleic acid profiles.

While some solutions have been presented, they are inadequate for any number of reasons. For example, flow cytometry is an example of a single cell analysis technique. Flow cytometry differentiates cells based on their spatial scattering profile or their bulk fluorescence. However, flow cytometry does not obtain genetic and/or mechanical information about a cell. To obtain the mechanical properties of a cell, deformation flow cytometry may be performed which combines differentiation based on fluorescence and scattering with cell deformation behavior. However, deformation flow cytometry does not obtain genetic information.

In some cases, single cell genomic analysis may be performed. In this example, cell solutions are diluted and aliquoted into wells. The wells are lysed indiscriminately and after certain preparation operations, the genetic material is sequenced. However, this does not indicate any mechanical information about the cell nor of the cell membrane.

The present specification provides for such an individual cell lysis and multi-modal analysis. That is, the present specification describes a system for simultaneously obtaining genetic (RNA, DNA) information and mechanical information of a cell population with single cell resolution in an automated fashion on a large number of cells. The system includes a reservoir that holds a cell suspension, a microfluidic channel that segregates the cells such that they enter single file into a lysing chamber. Within the lysing chamber a feedback-controlled chemical lysing operation is carried out. Information regarding the lysing operation and the properties of the lysate are passed to a controller to analyze the cell based on both pieces of information. Accordingly, valuable information from precious cell populations can be made even when the number of cells to be analyzed cannot be increased.

In some examples, the microfluidic channel includes a cell presence sensor that detects the presence of a cell near the orifice, which triggers the lysing agent distributors to eject a lysing agent into the lysing chambers. This same sensor, or another sensor, also detects the lysis of the cell and forms a feedback loop that both measures the parameters of lysis (i.e., the lysing agent used and the quantity used) to lyse a cell.

Specifically, the present specification describes a chemical lysis system. The chemical lysis system includes a microfluidic channel to serially feed individual cells from a volume of cells to at least one chemical lysing device. The chemical lysing device includes at least one lysing chamber to receive, from the microfluidic channel, a single cell to be lysed. The chemical lysing device also includes an orifice disposed in each lysing chamber to receive a lysing agent. The chemical lysing system also includes a sensor to detect a state within the lysing chamber and a controller to analyze a ruptured cell.

The present specification also describes a method. According to the method, a cell to be lysed is received in a lysing chamber. At least one lysing agent is introduced through at least one orifice in the lysing chamber. The at least one lysing agent is introduced in cycles until the cell membrane ruptures. Based on an output of a sensor disposed within the lysing chamber, it is determined when the cell membrane has ruptured.

The present specification also describes a cell analysis system. The cell analysis system includes at least one cell analysis device. Each cell analysis device includes a microfluidic channel to serially feed individual cells from a volume of cells into a lysing chamber. Each cell analysis device also includes at least one chemical lysing device that includes 1) at least one lysing chamber, 2) an orifice disposed in each lysing chamber to receive a lysing agent, and 3) a sensor per orifice to detect a state within the lysing chamber. The cell analysis system also includes a cell reservoir to hold a volume of cells and a number of agent reservoirs, each agent reservoir to hold a volume of a lysing agent. The cell analysis system also includes a lysing agent distributor per agent reservoir to introduce the lysing agent through each orifice. A controller of the cell analysis system analyzes the cell. The controller includes 1) a lysate analyzer to analyze properties of a lysate of the cell, 2) a rupture analyzer to determine a rupture threshold of the cell based on parameters of a cycle when a cell membrane ruptures, and 3) a component controller to activate components of the cell analysis system based on an output of the sensor.

Accordingly, the present device provides for single cell lysis and extraction of cell content for a large number of single cells at a time, measuring the lysis condition, and portioning single cell contents. This allows researchers to obtain single cell nucleic acid analysis, proteomic, metabolomic, and cell membrane analysis simultaneously and to correlate these results.

In summary, using such a chemical lysis system 1) provides for effective monitoring of cell lysis on a per-cell basis; 2) ensures sufficient lysis without degradation to cell contents; 3) provides control of the amount of analyte to be delivered downstream; 4) identifies subsets of cell population that are difficult to lyse; 5) provides a feedback signal for automated control of the lysis operation, 6) allows combined cell analysis, i.e., a genetic analysis and a mechanical property analysis; 7) can be integrated onto a lab-on-a-chip; 8) is scalable and can be parallelized for high throughput, 9) is low cost and effective, and 10) reduces the contamination of the sample, in particular by the lysing agent on the lysate. However, the devices disclosed herein may address other matters and deficiencies in a number of technical areas.

As used in the present specification and in the appended claims, the term "cell membrane" refers to any enclosing structure of a cell, organelle, or other cellular particle.

Further, as used in the present specification and in the appended claims, the term "cycle" refers to a period when a cell is exposed to a single microdroplet of a lysing agent. For example, a cycle may refer to each time a microdroplet of the lysing agent is introduced into the lysing chamber where a cell resides.

Even further, as used in the present specification and in the appended claims, the term "rupture threshold" refers to the amount of stress that a cell can withstand before rupturing. In other words, the rupture threshold is the threshold at which the cell ruptures. The rupture threshold may be determined based on any number of factors including a number of cycles a cell is exposed to, the quantity of lysing agent per microdroplet, and the type of lysing agent.

Yet further, as used in the present specification and in the appended claims, the term "parameters" refers to the operating conditions in a particular cycle. For example, a "parameter" may refer to a type of lysing agent, a concentration of the lysing agent, a temperature at which the lysing agent is introduced, and/or the size of a microdroplet of the lysing agent introduced.

Turning now to the figures, FIG. 1 is a block diagram of a chemical lysis system (100), according to an example of the principles described herein. In some examples, the chemical lysis system (100) is part of a multi-function chip, which may be referred to as a lab-on-a-chip device. A lab-on-a-chip device combines several laboratory functions on a single integrated circuit which may be disposed on a silicon wafer. Such lab-on-a-chip devices may be a few square millimeters to a few square centimeters, and provide efficient small-scale fluid analysis functionality.

In other words, the components, i.e., the microfluidic channel (102) and chemical lysing device(s) (104) may be microfluidic structures. A microfluidic structure is a structure of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.).

The chemical lysis system (100) includes a microfluidic channel (102) to serially feed individual cells form a volume of cells to lysing chambers (106) of the chemical lysing device(s) (104). That is, the chemical lysis system (100) of the present specification describes a per-cell lysing. Accordingly, the microfluidic channel (102) may have properties such that cells are passed individually. The microfluidic channel (102) is coupled at one end to a cell reservoir and directs cells single-file into lysing chambers (106). Such a serial, single-file introduction of cells into the lysing chamber (106) may be facilitated by a microfluidic channel (102) having a cross-sectional area size on the order of the cell diameter.

The chemical lysis system (100) includes at least one chemical lysing device (104) to agitate a cell. Specifically, the chemical lysing device (104) includes at least one lysing chamber (106). Each lysing chamber (106) is to receive, from the microfluidic channel (102), a single cell to be lysed. In some examples, the lysing chamber (106) may be no more than 100 times a volume of a cell to be lysed. In other examples, the lysing chamber (106) may be of a size comparable with the cell and in some cases even smaller so as to deform the cell before or during the rupturing of the cell membrane. That is, the lysing chamber (106) may be a microfluidic structure. Thus, lysing operations can be performed on a single cell and that cell's particular properties may be analyzed and processed.

Each lysing chamber (106) includes an orifice (108) to receive a lysing agent. As described above, in some examples chemical lysing, as opposed to physical lysing may be performed. Specifically, some cells may be more easily chemically lysed. Moreover, chemical lysing may be gentler and therefore desirable when operating on certain types of cells. In these scenarios a lysing agent, via the orifice (108), may be added to the lysing chamber (106) where a cell resides and awaits lysing.

The lysing agent may be of a variety of types and operate via a variety of chemical actions. For example, the lysing agent may be a hypotonic agent which causes the cell to take on water. As the cell takes on water, it swells and ultimately bursts. A hypertonic agent works by reducing the amount of water in the cell. Accordingly, the cell shrivels up and ruptures. As an example, a hypotonic solution may be a dilute sucrose solution.

In another example, a cell may be chelated wherein an acid such as ethylenediaminetetraacetic acid diminishes the cell membrane's permeability membrane, leaving holes in the cell walls.

Surfactants may also be used as lysing agent. A surfactant operates to disrupt the interface between hydrophobic and hydrophilic systems. Cell membranes include such an interface. In this example, surfactants solubilize membrane proteins and lipids to dissolve this interface. This dissolving of the interface causes the cell components to spill out as there is no longer an interface to retain them inside as the cell membrane has deteriorated. One example of such a surfactant-based lysing agent is sodium dodecyl sulphate.

As yet another example the lysing agent may be a chaotropic agent such as urea and guanidine which disrupt the structure of water and make it less hydrophilic. Doing so weakens hydrogen bonds and thus cause denaturation of the cell membrane.

In addition to those specific examples of lysing agents described above, other examples of lysing agents include cetylmethylammonium bromide, polyethylene glycol p-(1, 1, 3, 3-tetramethylbutyl)-phenyl ether or triton x-100, 3-[(3-cholamidopropyl) dimethylammonio]-1-propanesulfonate, and 4-nonylphenyl-polyethylene glycol among others. As yet another example, the lysing agent may be ammonium chloride. For example, erythrocytes, or red blood cells, can be lysed via an ammonium chloride solution.

As yet another example, bacterial cells may be lysed by inhibiting the synthesis of a peptidoglycan layer of bacterial cell walls. The Presence of peptidoglycan precursors trigger autolytic cell wall hydrolases which digest the remaining cell wall. Without the cell wall, only a spheroplast membrane remains, which can be easily lysed by a hyper or hypoosmotic media.

In addition to the gentle nature of chemical lysing, and the fact that it is desired for certain types of cells, chemical lysing provides additional information regarding a cell. For example, as the chemical lysing device (104) allows for the titration of a lysing agent, a scientist may be able to determine the resilience of a cell to the lysis agent. For example, the chemical lysis system (100) can be used to estimate the dose of lytic antibiotics, such as B-lactams, (penicillins, carbapenems, and cephalosporins) and glycopeptides, used to lyse bacteria. This information on the bacterial resistance to a lysing agent is useful in many circumstances. For example, this information provides insight into the biological pathways of cells, including their lysis, as well as for discriminating cells for diagnostic purposes. The orifice may be of a variety of sizes. For example, the orifice (108) may be less than 25 micrometers in diameter.

The chemical lysing device (104) also includes a sensor (110) per orifice (108). The sensor (110) detects a state within the respective lysing chamber (106). Accordingly, the lysis operation of the chemical lysing device (104) may be feedback-controlled.

The sensor (110) provides a quality control check over a lysing operation. That is, as described above, in traditional lysing, a lysing agent is added to a mixture and an operator hopes for the best, that is that the cell is lysed. However, such an operation is imprecise and may use more lysing agent than is necessary. The excess lysing agent may contaminate the cell and may break the cell contents down as well. The sensor (110) prevents such effects. That is, the sensor (110) determines when a cell has ruptured and triggers the ejection of more lysing agent in the case the cell has not ruptured. That is, the sensor (110) detects a change in the cell based on the action of a lysing agent. If no change is detected, more lysing agent is added. By comparison, if a change is detected, the lysing agent distributors are prevented from ejecting more lysing agent. Accordingly, rather than adding an arbitrary amount of lysing agent and hoping that lysing occurs, a feedback-controlled chemical lysing device (104) includes a sensor (110) to regulate use of just the right amount of lysing agent to ensure lysing occurs prior to further processing of the lysate.

The sensor (110) may take many forms. For example, the sensor (110) may be an optical scatter sensor that determines cell rupture based on a scatter of reflected energy waves. The sensor (110) may be an optical fluorescence sensor that detects cell rupture based on the detection of certain fluorescent markers. In other examples, the sensor (110) may be an optical bright field sensing system, an optical dark field sensing system, or a thermal property sensor.

In one particular example, the sensor (110) is an impedance sensor. Specifically, the sensor (110) may include at least one pair of electrodes spaced apart from one another by a gap. These electrodes detect a level of conductivity within the gap. That is, incoming cells to a lysing chamber (106), and the solution in which they are contained, have a predetermined electrical conductivity. Any change to the contents within the lysing chamber (106) will effectively change the electrical conductivity within the lysing chamber (106). Specifically, as the cells are ruptured and the nucleic acid pours out, the conductivity would increase. To measure the conductivity, a resistance of solution between electrodes of the impedance sensor is measured and a conductivity determined therefrom. In some examples, a single pair of electrodes are used, with one electrode plate placed at either end of a chamber. In another example, multiple pair of electrodes are used. For example, one pair of electrode plates could be placed at the inlet and another pair of electrode plates placed at the outlet.

Thus, in summary, the sensor (110) which may include one sensor (110) in the lysing chamber (106) or which may include multiple sensors (110) in the lysing chamber (106), can determine when a cell membrane has been ruptured.

The chemical lysis system (100) also includes a controller (112) to analyze a ruptured cell. Specifically, the controller (112) determines when the cell membrane has ruptured based on an output of the sensor (110). As a specific example of an impedance sensor, the controller (112) may compare detected levels of conductivity within the lysing chamber (106) with a threshold level of conductivity associated with a ruptured cell. Accordingly, once the detected level of conductivity within the lysing chamber (106) has reached the threshold value, the controller (112) may determine that a cell has been ruptured.

The controller (112) also determines an amount of the lysing agent used to rupture the cell. That is, a notification of each ejection event may be passed to the controller (112), which may have a mapping between an ejection event and the amount of lysing agent applied. Accordingly, by knowing the number of ejection events, the quantity of lysing agent ejected per ejection event, the type of lysing agent ejected, a temperature at which the lysing agent is introduced, and the point at which the cell ruptures (as determined by the sensor (110)), the controller (112) can determine the rupture threshold of the cell. This information, i.e., the mechanical strength of a cell, may be used by the controller (112) or passed to a downstream system for further analysis of the particular cell.

As described herein, the present specification describes a chemical lysis system (100) that monitors the lysis operation. Such control can provide closed-loop feedback to ensure complete lysis. Moreover, such control can be used to control lysing parameters such as lysing agent distribution. The chemical lysis system (100) having more control therein, enhances the efficiency of downstream analytics as subsequent systems can know with certainty an amount of starting material. Such knowledge increases the reliability and credibility of any final results/analysis.

Figure 2A:
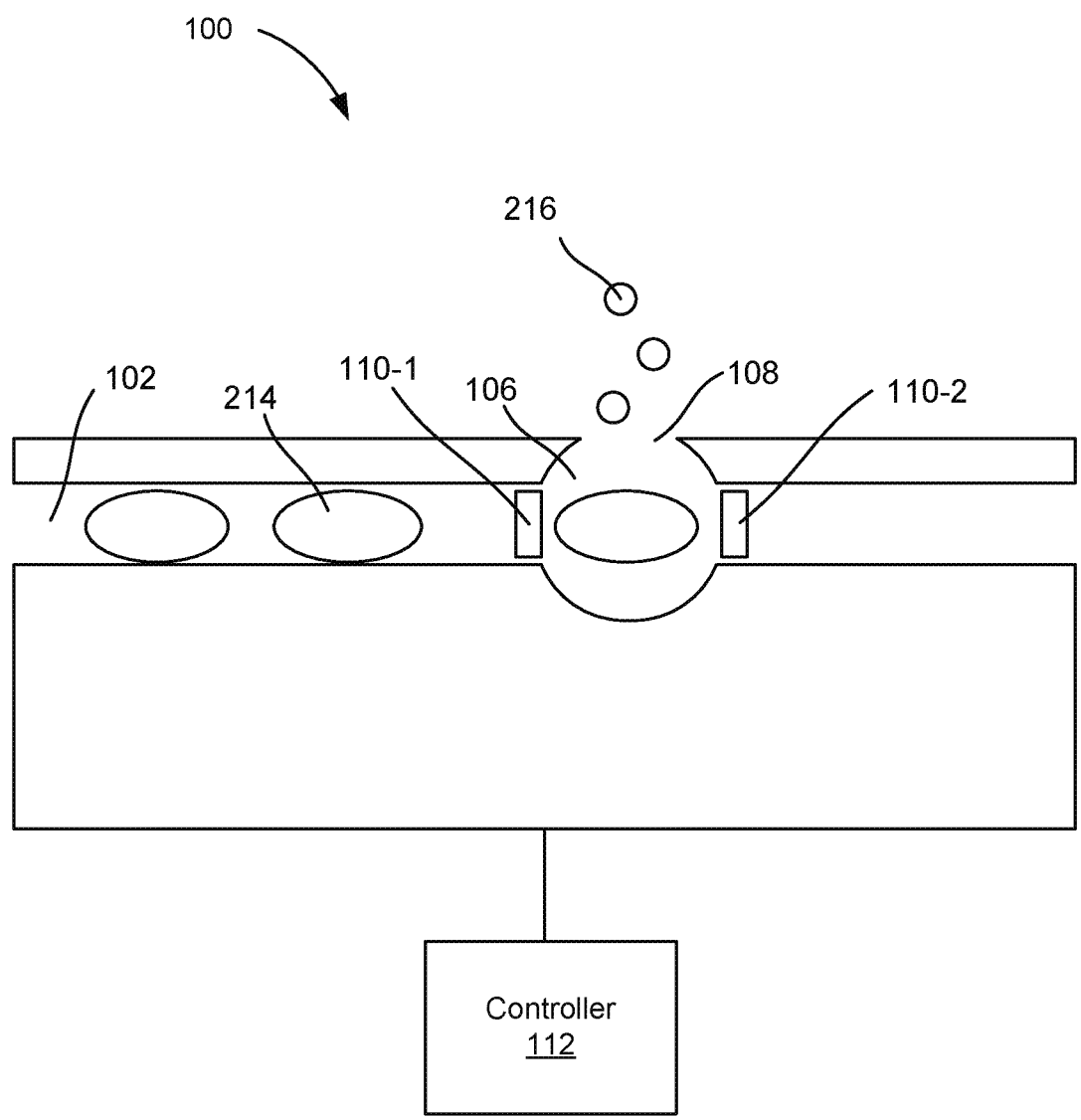
FIGS. 2A and 2B are diagrams of a chemical lysis system, according to an example of the principles described herein.
Figure 2B:
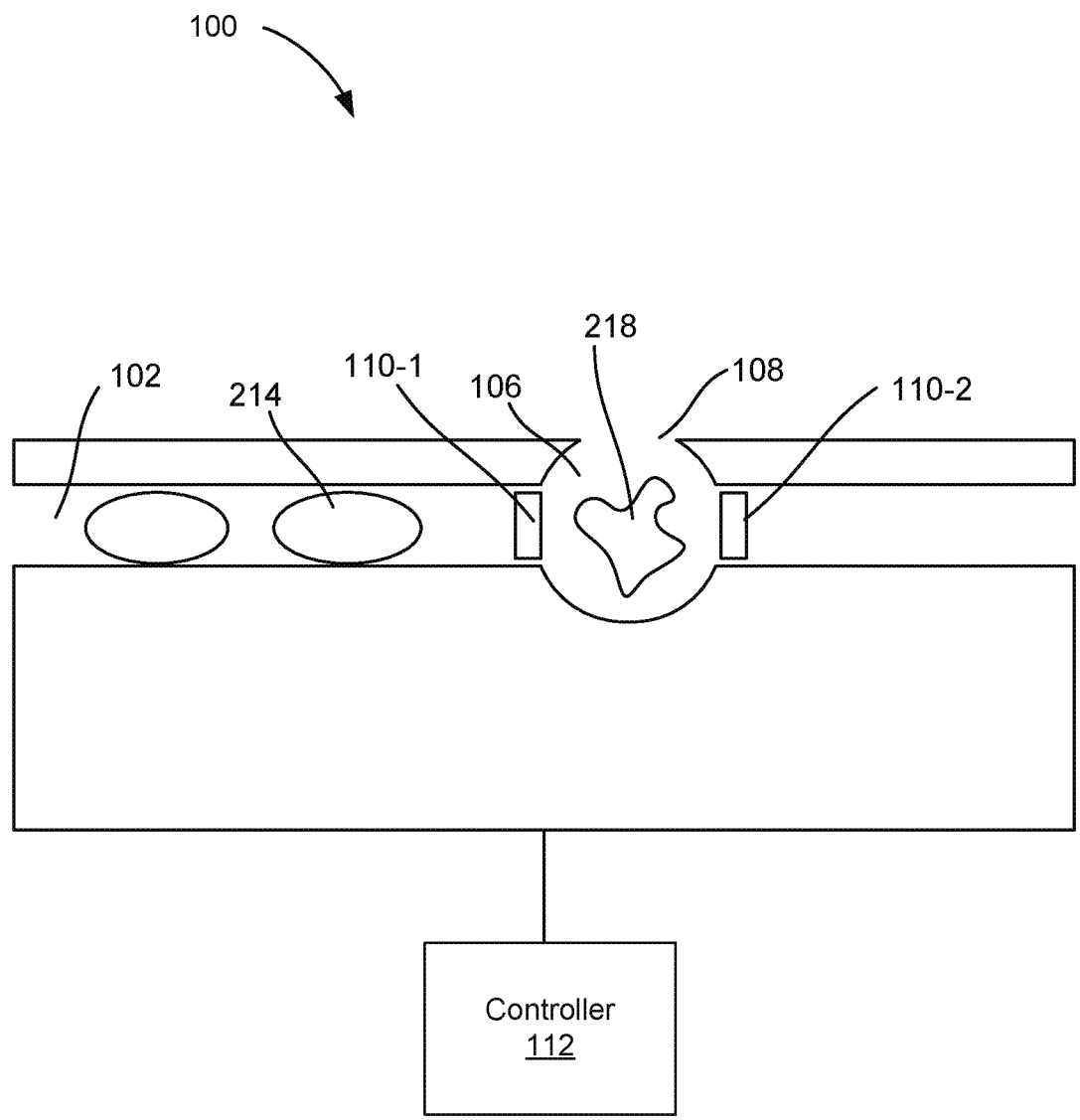

FIGS. 2A and 2B are diagrams of a chemical lysis system (100), according to an example of the principles described herein. Specifically, FIG. 2A depicts the chemical lysis system (100) before a cell (214) has been lysed and FIG. 2B depicts the chemical lysis system (100) after the cell (214) has been lysed. As described above, the chemical lysis system (100) may provide for closed-loop feedback to ensure an appropriate lysis yield. For example, as depicted in FIG. 2A, a cell (214) to be lysed is passed in single-file fashion along a microfluidic channel (102) until it arrives in a lysing chamber (106). At this point, lysing agent (216) is passed into the lysing chamber (106) via an orifice (108). As no lysing has yet occurred, the state within the lysing chamber (106), as measured by the sensor (110-1, 110-2), has not changed. Information regarding the constant state within the lysing chamber (106) is passed to the controller (112) which periodically instructs ejection of more lysing agent (216) into the lysing chamber (106).

As depicted in FIG. 2B, the lysing agent (216) has successfully lysed the cell (214). That is, the lysate (218) of the cell (214) has been released. The presence of the lysate (218) changes a state, for example the conductivity, within the lysing chamber (106). The change in state is detected by the sensors (110-1, 110-2). This change of state information is passed to the controller (112) which deactivates the ejection of additional lysing agent (216). That is, the controller (112) may receive the measurements of the sensors (110-1, 110-2) to determine if a cell (214) has been lysed. In a specific example, impedance sensor (110) may provide a conductivity measurement. The controller (112) can compare this value to a threshold conductivity value that maps to a desired level of lysis. If the measured value is greater than the reference value, a determination made is made regarding cell (214) lysis. By comparison, if the measured value is less than the reference value, the controller (112) may activate a lysing agent distributor in a second attempt to lyse the particular cell (214). Thus, a controlled feedback for cell (214) lysis is achieved based on monitoring the state within a lysing chamber (106) where the lysing occurs. That is, based on feedback from the sensors (110), lysis is either continued or stopped.

In addition to controlling the lysing agent distributors, the output of the sensor (110) may control other components. For example, once lysis is detected a pump of the system may be triggered to move the lysate (218) downstream.

Figure 3:
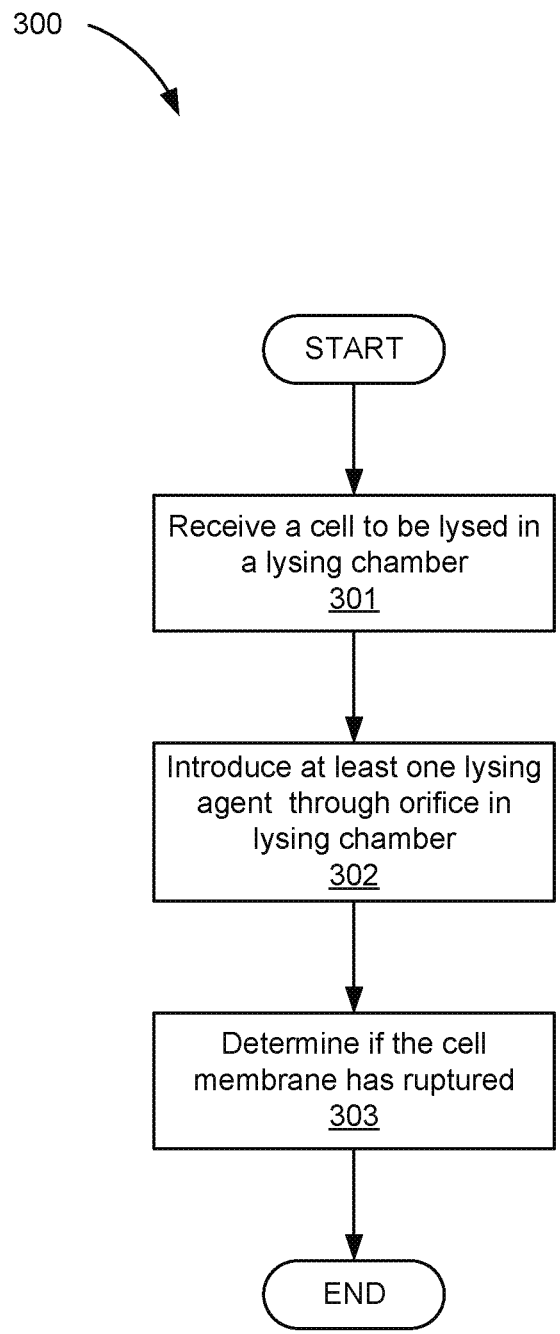
FIG. 3 is a flowchart of a method for chemical lysis, according to an example of the principles described herein.

FIG. 3 is a flowchart of a method (300) for chemical lysis, according to an example of the principles described herein. According to the method (300), a cell (FIG. 2, 214) to be lysed is received (block 301) in a lysing chamber (FIG. 1, 106). That is, a fluid that contains a cell (FIG. 2, 214) is transported into the lysing chamber (FIG. 1, 106). In some examples this is done by activating a pump which is integrated into a wall of the microfluidic channel (FIG. 1, 102). In other examples this is done by other mechanisms, such as the effect of gravity resulting from a cell reservoir being disposed above the chemical lysing devices (FIG. 1, 104) of the chemical lysis system (FIG. 1, 100).

In some examples, the volume of cells (FIG. 2, 214) are serially received (block 301) at each lysing chamber (FIG. 1, 106). That is, each cell (FIG. 2, 214) within the sample may be received (block 301) one at a time. In some examples, each chemical lysis system (FIG. 1, 100) includes a microfluidic channel (FIG. 1, 102) that gates introduction of one cell (FIG. 2, 214) at a time into the lysing chamber (FIG. 1, 106) for admixture with the lysing agent (FIG. 2, 216). Such a serial, single-file introduction of cells (FIG. 2, 214) into each lysing chamber (FIG. 1, 106) may be facilitated by microfluidic channels (FIG. 1, 102) having a cross-sectional area size on the order of the cell (FIG. 2, 214) diameter. Such single-file, or serial, inlet of cells (FIG. 2, 214) facilitates an individual analysis of cells (FIG. 2, 214). Accordingly, rather than analyzing a portion of the sample and extrapolating therefrom, each cell (FIG. 2, 214) of the sample may be analyzed. Thus, a complete analysis of the sample is performed. As described above, the chemical lysis system (FIG. 1, 100) may include any number of chemical lysing devices (FIG. 1, 104). Thus, while each chemical lysing device (FIG. 1, 104) lyses a single cell (FIG. 2, 214) at a time, a die with multiple chemical lysing devices (FIG. 1, 104) may analyze the cells (FIG. 2, 214) in parallel. Doing so may increase throughout.

At least one lysing agent (FIG. 2, 216) is introduced (block 302) through the orifice (FIG. 1, 108) in the lysing chamber (FIG. 1, 106). Such introduction (block 302) may be cyclical until a cell (FIG. 2, 214) ruptures. That is, the lysing agent (FIG. 2, 216), whatever it may be, is introduced microdroplet by microdroplet until the sensors (FIG. 1, 110) detect that the cell (FIG. 2, 214) has lysed. As described above, the lysing agent may be of a variety of types, and may operate via any number of chemical lysing mechanisms. For example, the lysing agent may be a hypotonic agent, a hypertonic agent, a surfactant, a chelating agent, and/or a chaotropic agent to name a few.

As a specific example, following a first microdroplet of the lysing agent (FIG. 2, 216), the sensor (FIG. 1, 110) may determine that the cell (FIG. 2, 214) is still intact by, for example, indicating that there is no change in the measured characteristic prior to, and following ejection of the first microdroplet of the lysing agent (FIG. 2, 216). By comparison, following a third microdroplet of the lysing agent (FIG. 2, 216), the controller (FIG. 1, 112) may determine (block 303), that the cell (FIG. 2, 214) has ruptured by, for example, indicating that there is a change in a measured characteristic prior to, and following ejection of the third microdroplet of the lysing agent (FIG. 2, 216).

As a specific example, the controller (FIG. 1, 112) can consult a database with a mapping to determine if the measured level of conductivity is lesser or greater than a value indicative of a threshold lysing. If greater than the threshold value, the controller (FIG. 1, 112) may deactivate the lysing agent distributor. If not greater than the threshold value, the controller (FIG. 1, 112) may activate or re-activate, the lysing agent distributor for additional chemical lysing to hopefully lyse the cell (FIG. 2, 214) in a second attempt.

That is, the at least one lysing agent (FIG. 2, 216) is introduced (block 302) microdroplet by microdroplet until the cell (FIG. 2, 214) membrane ruptures and it is determined (block 303) that a cell (FIG. 2, 214) membrane has ruptured based on an output of the sensor (FIG. 1, 110) disposed within the lysing chamber (FIG. 1, 106).

Such a closed loop chemical lysing operation, performed at a per-cell basis, allows for precise lysing as just the amount of lysing agent (FIG. 2, 216) to rupture a cell (FIG. 2, 214) is added. This 1) reduces the waste of lysing agent (FIG. 2, 216), 2) reduces the continued lysing of the cell components from excess lysing agent (FIGS. 2, 216) and 3) allows for precise information relating to a cell's (FIG. 2, 214) chemical strength which can be used to further analyze the cell (FIG. 2, 214).

Without feedback-controlled lysis, the cell (FIG. 2, 214) may leave the lysing chamber (FIG. 1, 106) intact. Outputting an intact cell (FIG. 2, 214) when a lysate (FIG. 2, 218) is desired and/or expected, may result in skewed results. Accordingly, when a sensor (FIG. 1, 110) indicates that, despite the operations of the lysing agent (FIG. 2, 216), the cell (FIG. 2, 214) membrane has not ruptured, the controller (FIG. 1, 112) may activate a lysing agent distributor. In this example, a second lysing cycle may be executed such that the cell (FIG. 2, 214) may be ruptured. Accordingly, such a feedback-controlled lysing operation ensures that a cell (FIG. 2, 214) that is intended to be lysed is in fact lysed.

Figure 4:
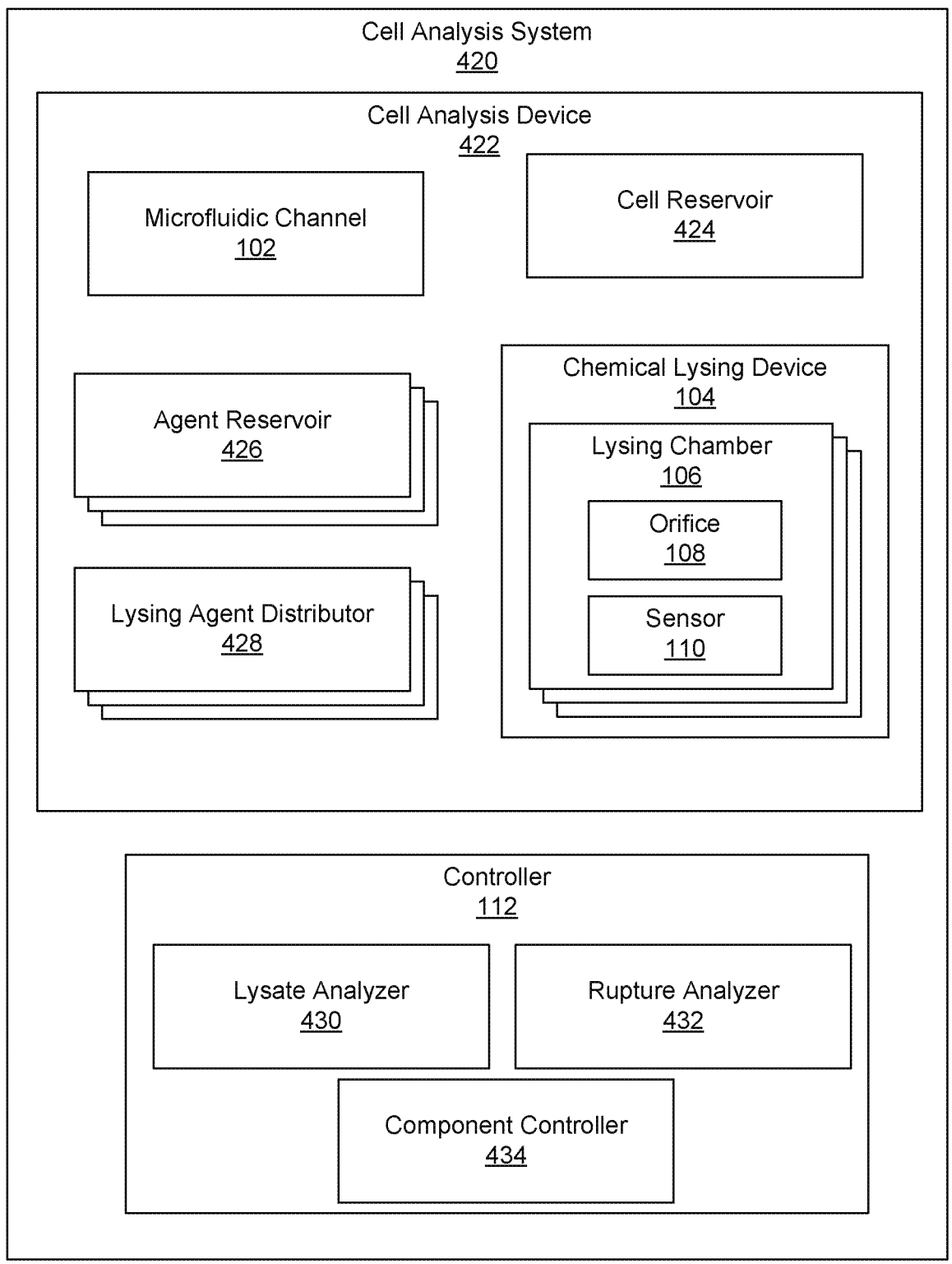
FIG. 4 is a block diagram of a cell analysis system, according to an example of the principles described herein.

FIG. 4 is a block diagram of a cell analysis system (420), according to an example of the principles described herein. In some examples, the cell analysis system (420) is part of a lab-on-a-chip device. A lab-on-a-chip device combines several laboratory functions on a single integrated circuit which may be disposed on a silicon wafer. Such lab-on-a-chip devices may be a few square millimeters to a few square centimeters, and provide efficient small-scale fluid analysis functionality.

In other words, the components, i.e., the cell analysis device(s) (422), microfluidic channel(s) (102), reservoirs (424, 426), lysing agent distributors (428), and chemical lysing devices (104) may be microfluidic structures. A microfluidic structure is a structure of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.).

The cell analysis system (420) include at least one cell analysis device (422). The cell analysis device (422) refers to the components that perform multiple operations on a cell (FIG. 2, 214). In some examples, each component that makes up the cell analysis device (422) is disposed on a single substrate. Thus, each operation may be carried out on a single silicon substrate. That is, the present cell analysis system (420) facilitates the complete analysis of a cell (FIG. 2, 214), at a single cell (FIG. 2, 214) resolution, on a single physical structure.

Figure 5:
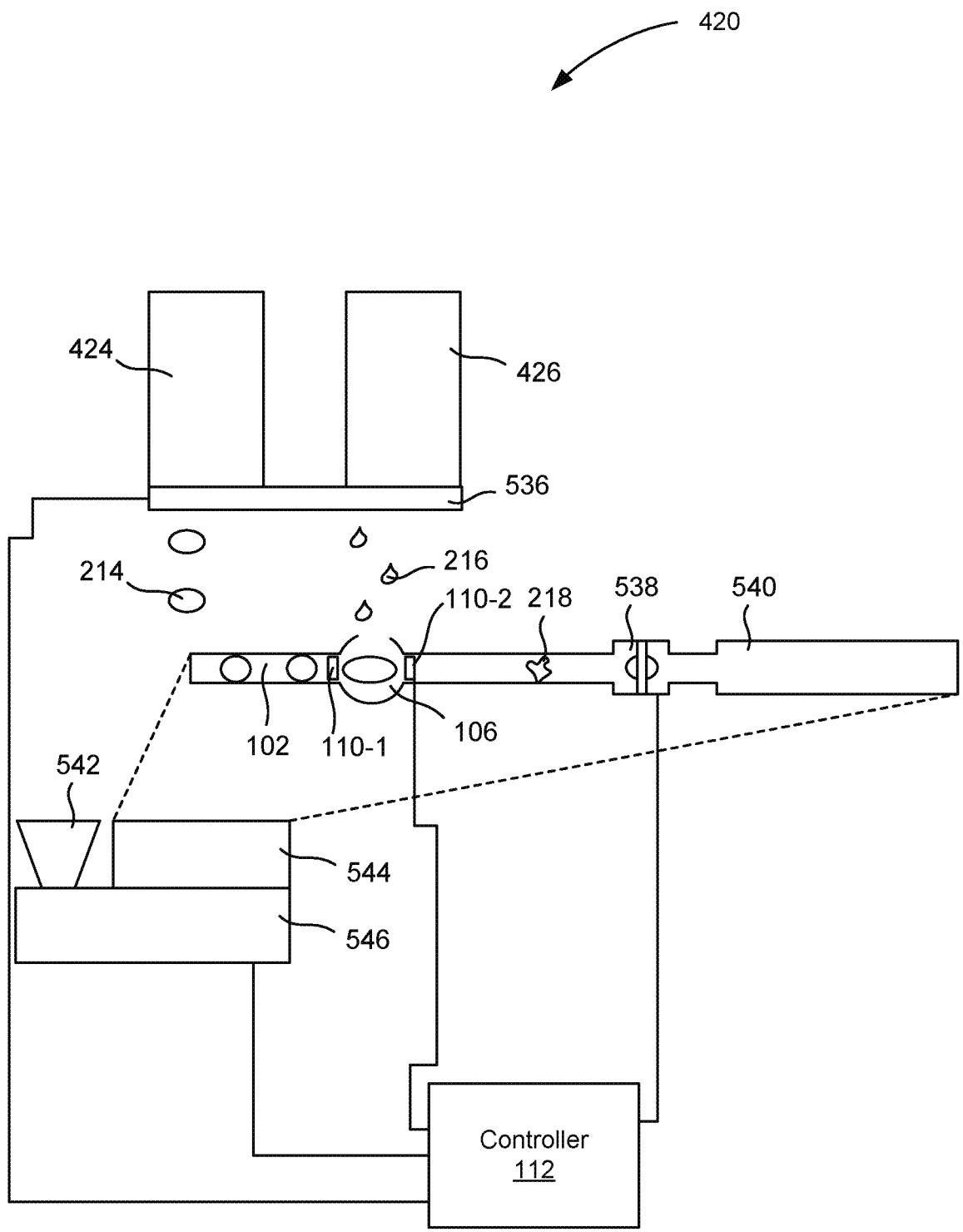
FIG. 5 is a diagram of a cell analysis system, according to an example of the principles described herein.
Figure 7:
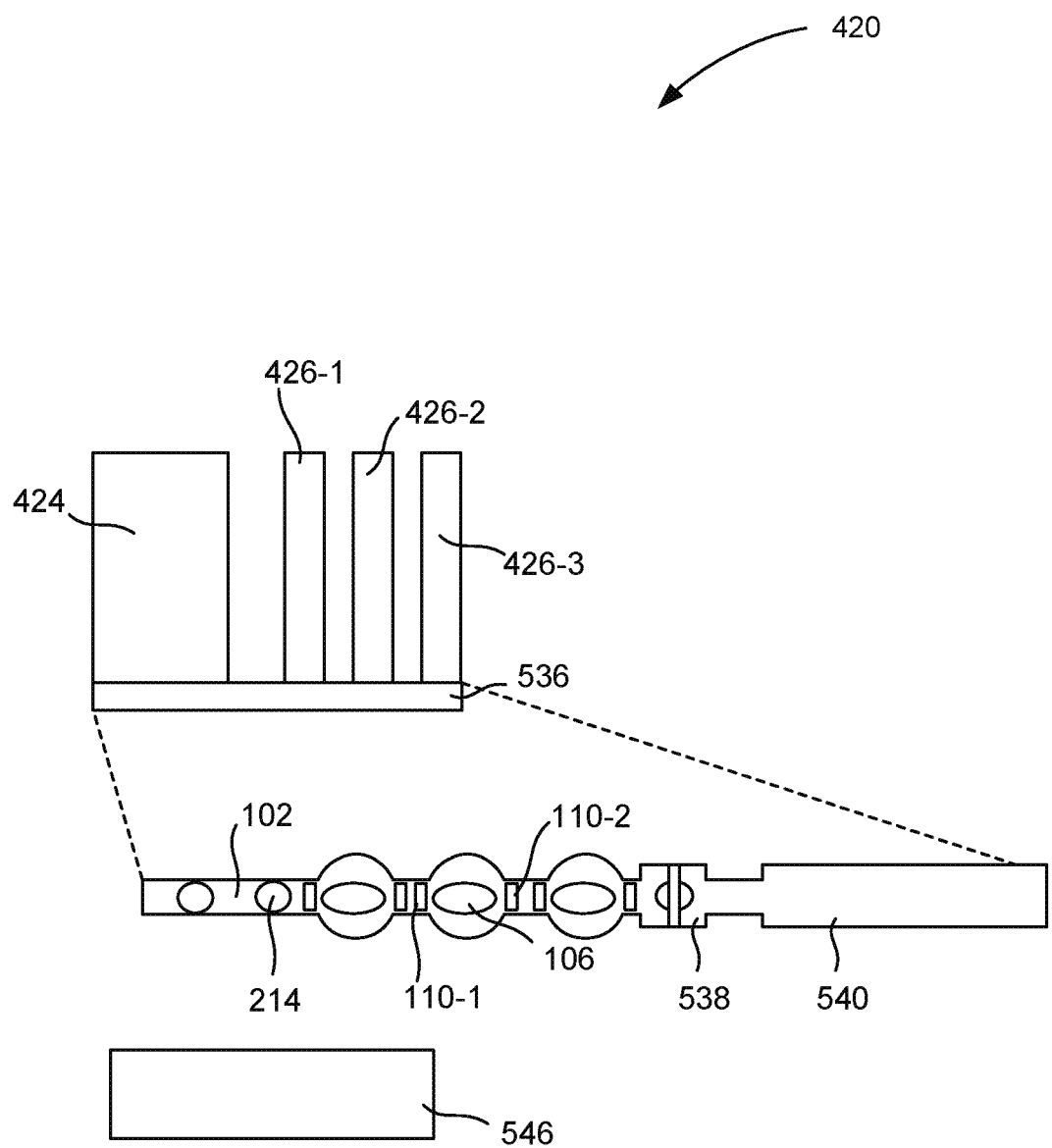
FIG. 7 is a diagram of a cell analysis system, according to an example of the principles described herein.
Figure 8:
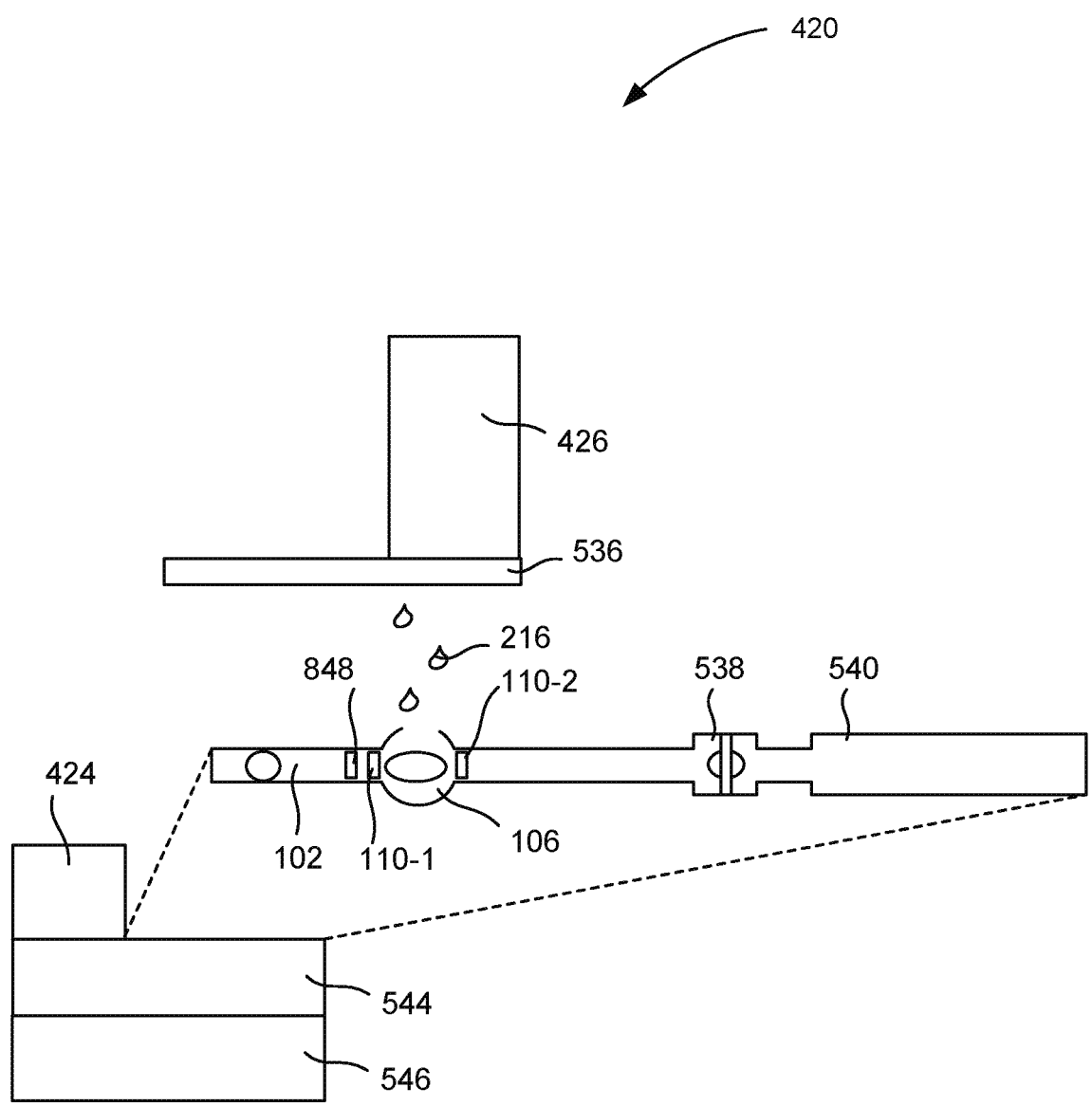
FIG. 8 is a diagram of a cell analysis system, according to an example of the principles described herein.

In other examples, different components may be on different substrates. For example, the reservoirs (424, 426) and lysing agent distributors (428) may be on different substrates in different combinations as depicted in FIGS. 5, 7, and 8. The substrates may be formed of any material including plastic and silicon, such as in a printed circuit board.

In some examples, the cell analysis system (420) may include multiple cell analysis devices (422) such that high cell (FIG. 2, 214) throughput is attained.

The cell analysis device (422) includes the microfluidic channel (102) that serially feeds individual cells (FIG. 2, 214) into the lysing chamber (106). The cell analysis device (422) also includes the chemical lysing device (104) with the at least one lysing chamber (106) and the orifice (108) disposed in each lysing chamber (106) to receive a lysing agent (FIG. 2, 216). The lysing chamber (106) also includes a sensor (110) per orifice (108) to detect a state within the lysing chamber (106).

The cell analysis device (422) may include additional components such as a cell reservoir (424) to hold a volume of cells (FIG. 2, 214) and a number of agent reservoirs (426), each to hold a volume of a lysing agent (FIG. 2, 216). The cell analysis device (422) also includes a lysing agent distributor (428) per agent reservoir (426) to introduce the lysing agent (FIG. 2, 216) through each orifice (108).

The cell analysis system (420) also includes a controller (112) that analyzes the cells (FIG. 2, 214) of the sample. The controller (112) includes various components to make such an analysis. First, the controller (112) includes a lysate analyzer (430) to receive information regarding the lysate (FIG. 2, 218) and to analyze properties of the lysate (FIG. 2, 218) of the cell (FIG. 2, 214). That is, after the cell (FIG. 2, 214) has been ruptured, the contents therein may be analyzed and information provided to the lysate analyzer (430). A variety of pieces of information can be collected from the lysate (FIG. 2, 218). For example, cytoplasmic fluid within the cell (FIG. 2, 214) may provide a picture of the current mechanisms occurring within the cell (FIG. 2, 214). Examples of such mechanisms include ribonucleic acid (RNA) translation into proteins, RNA regulating translation, and RNA protein regulation, among others. As another example, nucleic fluid can provide a picture of potential mechanisms that may occur within a cell (FIG. 2, 214), mechanisms such as mutations. In yet another example, mitochondrial fluid can provide information as to the origin of the cell (FIG. 2, 214) and the organism's matrilineal line.

The controller (112) also includes a rupture analyzer (432) which determines a rupture threshold of the cell (FIG. 2, 214) based on the parameters of the lysing cycle when the cell (FIG. 2, 214) membrane ruptures. That is, as described above a cell (FIG. 2, 214) may be exposed to one or multiple lysing cycles, a cycle referring to application of a microdroplet of a lysing agent (FIG. 2, 216). Information regarding the parameters (quantity of lysing agent (FIG. 2, 216) and type of lysing agent (FIG. 2, 216)) are passed to the rupture analyzer (432) which determines a rupture threshold of the cell (FIG. 2, 214).

The rupture analyzer (432) may use this information to perform a variety of analytical operations. For example, the rupture analyzer (432) may differentiate cells (FIG. 2, 214) in a sample based on different rupture thresholds. In this example, the rupture analyzer (432) may receive, for multiple cells (FIG. 2, 214), information regarding the results of lysing. Based on the results, the rupture analyzer (432) may determine when each cell (FIG. 2, 214) in a sample is ruptured. Different types of cells (FIG. 2, 214) may rupture under different intensities. Accordingly, based on when a cell (FIG. 2, 214) ruptures, the rupture analyzer (432) may be able to determine the cell (FIG. 2, 214) type.

As another example, the rupture analyzer (432) may be able to determine a state of a cellular sample. For example, it may be determined that healthy cells (FIG. 2, 214) rupture at a particular lysing intensity. This may be determined by passing healthy cells (FIG. 2, 214) through the cell analysis system (420) and collecting rupturing information. Accordingly, a sample to be analyzed may subsequently be passed through the cell analysis system (420) and rupturing information collected for these cells (FIG. 2, 214) in the sample. If the rupturing information indicates that the sample cells (FIG. 2, 214) rupture at a lower intensity than the healthy cells (FIG. 2, 214), the rupture analyzer (432) may determine that the sample cells are diseased.

As yet another example, the rupture analyzer (432) may be able to differentiate between live cells (FIG. 2, 214) and dead cells (FIG. 2, 214) based on the rupturing thresholds of different cells (FIG. 2, 214) as determined by the cell analysis device (422). That is, live cells (FIG. 2, 214) may be more robust against lysing and therefore have a higher rupturing threshold as compared to dead cells (FIG. 2, 214) which may rupture at a lower intensity.

Thus, the present cell analysis system (420) provides a way to collect information related to both the lysate (FIG. 2, 218) and the mechanical properties of the cell (FIG. 2, 214) membrane from a single sample. Being able to collect both pieces from a single sample removes any bias resulting from intra-sample variation. For example, both the elasticity of a circulating tumor cell (FIG. 2, 214) as well as the genetic components of the tumor cell (FIG. 2, 214) may be determined from a single sample. As yet another example, both a stiffness of a red blood cell (FIG. 2, 214) as well as the genetic aspects of the cell (FIG. 2, 214) can be analyzed to determine if the cell (FIG. 2, 214) is affected by malaria. Being able to collect both pieces of information from a single sample also makes more effective use of the sample. That is, rather than requiring two groups of the sample, one for mechanical testing and one for genetic testing, both pieces of information from one group of the sample.

The controller (112) also includes a component controller (434) to activate components of the cell analysis system (420) based on an output of the sensor (110). For example, the component controller (434) may independently activate/deactivate certain of the lysing agent distributors (434).

FIG. 5 is a diagram of a cell analysis system (420), according to an example of the principles described herein. In the example depicted in FIG. 5, the cell analysis system (420) includes the microfluidic channel (102) through which individual cells (214) are passed towards a lysing chamber (106) to be lysed, based on feedback from the sensors (110) that is passed to the controller (112).

The example of FIG. 5 depicts other components of the cell analysis system (420). For example, the cell analysis system (420) and more specifically, the cell analysis device (FIG. 4, 422) may include an ejector (538) that ejects the lysate (218) of a ruptured cell (214). The lysate (218) may be expelled by the ejector (538) to a downstream analysis device for further analysis while the waste fluid is expelled to a waste reservoir (540) for collection and disposal.

The ejector (538) may include a firing resistor or other thermal device, a piezoelectric element, or other mechanism for ejecting fluid from the firing chamber. For example, the ejector (538) may be a firing resistor. The firing resistor heats up in response to an applied voltage. As the firing resistor heats up, a portion of the fluid in the firing chamber vaporizes to form a bubble. This bubble pushes the lysate (218) out the opening and onto a surface such as a microwell plate (546). As the vaporized fluid bubble collapses, a vacuum pressure along with capillary force within the firing chamber draws lysate (218) into the firing chamber from the lysing chamber (106), and the process repeats. In this example, the ejector (538) may be a thermal inkjet ejector (538).

In another example, the ejector (538) may be a piezoelectric device. As a voltage is applied, the piezoelectric device changes shape which generates a pressure pulse in the firing chamber that pushes a fluid out the opening. In this example, the ejector (538) may be a piezoelectric inkjet ejector (538).

In some examples, the chemical analysis device (FIG. 1, 104) and the microfluidic channel (102) are disposed on a chip (544) disposed over a microwell plate (546). The microwell plate (546) includes a variety of microwells, each to receive a lysate (218) from a single cell (214). Accordingly, the chip (544) may be above the microwell plate (546) and may move relative to the microwell plate (546) such that the ejectors (538) may move relative to, and deposit lysate (218) into, different wells of the well plate (546). In some examples, the microwell plate (546) also includes a waste receptacle (542) to collect waste from the cell reservoir (424), which cell reservoir (424) is a receptacle to hold a volume of fluid that includes cells (214) to be lysed and further analyzed. That is, the cell reservoir (424) in addition to including the cells (214) to be analyzed, may include other fluid. This other fluid may be expelled into the waste receptacle (542).

In this example, the cells (214) and the lysing agent (216) are provided to the chemical lysis system (100) via a separate substrate. That is, the chemical lysis system (FIG. 1, 100) includes a lysing agent distributor (FIG. 4, 428) to inject the lysing agent (216) through the orifice (FIG. 1, 108) to rupture a cell membrane. The chemical lysis system (100) also includes a cell reservoir (424) that holds the volume of cells (214) to be analyzed. The cells are then ejected from the first microfluidic die (536) onto the chip (544) and directed to the microfluidic channel (102) to be directed to a lysing chamber (106). For example, the microfluidic channel (102) and the at least one chemical lysing device (FIG. 1, 104) may be embedded in the chip (544). The chip (544) may include an orifice on its top layer that covers the microfluidic channel (102). The cell is introduced into the microfluidic channel (102) via this orifice.

In this example, at least one of the lysing agent distributor (FIG. 4, 428) and the cell reservoir (420) are formed in a different structure than a structure which houses the microfluidic channel (102) and the at least one chemical lysing device (FIG. 1, 104). For example, the lysing agent distributor (FIG. 4, 428) may be disposed in a first microfluidic die (536) and the microfluidic channel (102) and the at least one chemical lysing device (FIG. 1, 104) may be disposed on another microfluidic die, which other microfluidic die is the chip (544).

The source of the lysing agent (214) may also be disposed on the different microfluidic die (536). That is, at least one of the cell reservoir (424) and the agent reservoirs (422), which hold the lysing agent (216), are disposed on a different microfluidic die (536) than a microfluidic die (e.g., the chip (544)) that houses the microfluidic channel (102) and the at least one chemical lysing device (FIG. 1, 104).

As with the ejector (538), the lysing agent distributor (FIG. 4, 428) may include a firing resistor or other thermal device, a piezoelectric element, or other mechanism for ejecting fluid from the agent reservoir (422). While FIG. 5 depicts a single chemical lysing device (FIG. 1, 104), the cell lysis system (FIG. 1, 100) may include multiple chemical lysing devices (FIG. 1, 104) in parallel.

As depicted in FIG. 5, the controller (112) in addition to controlling the lysing agent distributor (FIG. 4, 428) based on feedback from the sensor (110) also controls other components. For example, the controller (112) may control the operation of the ejector (538) to activate at certain times to eject the lysate (218). The controller (112) may also control the movement of the chip (544) and/or the multi well plate (546) to ensure proper alignment during lysate (218) distribution.

The controller (112) may also be coupled to an ejector of the cells (214) such that cell ejection into the chip (544), and more specifically into individual lysing chambers (106) and/or the microfluidic channel (102) such that cells (214) are properly distributed therein.

Figure 6:
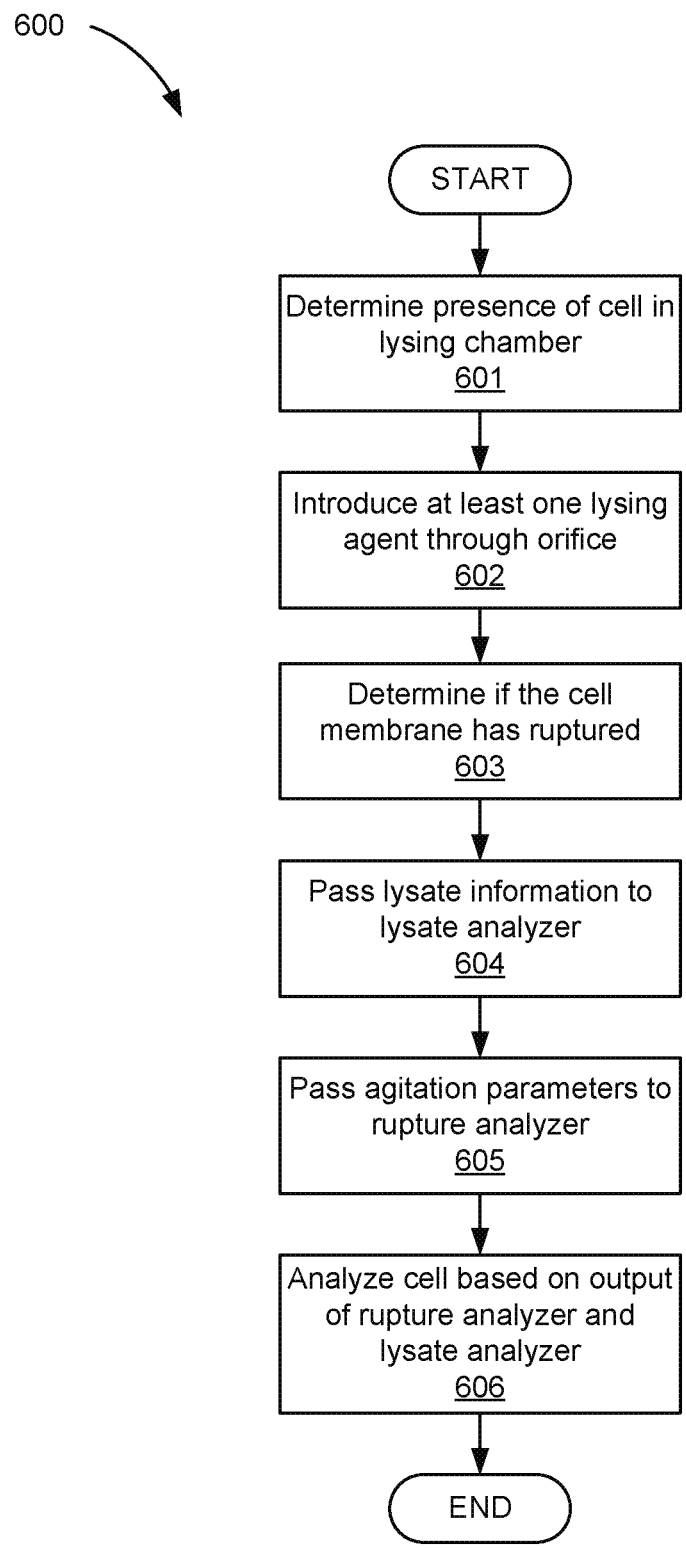
FIG. 6 is a flowchart of a method for chemical lysis, according to an example of the principles described herein.

FIG. 6 is a flowchart of a method (600) for chemical lysis, according to an example of the principles described herein. In some examples, the lysing operation may be triggered by the presence of a cell (FIG. 2, 214) within the lysing chamber (FIG. 1, 106). That is, the lysing agent distributor (FIG. 4, 428) is inactive when a cell (FIG. 2, 214) is not found within the lysing chamber (FIG. 1, 106) and upon the reception of a cell (FIG. 2, 214) in the lysing chamber (FIG. 1, 106), the lysing agent distributor (FIG. 4, 428) is activated. Accordingly, in this example, the method (600) includes determining (block 601) a presence of a cell (FIG. 2, 214) to be lysed in the lysing chamber (FIG. 1, 106). When such a cell (FIG. 2, 214) presence is determined, at least one lysing agent (FIG. 2, 216) is introduced (block 602) through the orifice (FIG. 1, 108) into the lysing chamber (FIG. 1, 106). This may be performed as described above in connection with FIG. 3. It is then determined (block 603) that the cell (FIG. 2, 214) membrane has ruptured, in some cases after multiple application of lysing agent (FIG. 2, 216) micro-droplets. Again, this may be performed as described above in connection with FIG. 3.

The rupturing of the cell (FIG. 2, 214) membrane triggers various actions. First, lysate information may be passed (block 604) to a lysate analyzer (FIG. 4, 430). For example, genetic information collected from a DNA cell (FIG. 2, 214) may be passed to the lysate analyzer (FIG. 4, 430). Additionally, parameters of the agitation that resulted in the cell (FIG. 2, 214) membrane rupture may be passed (block 605) to the rupture analyzer (FIG. 4, 432). The rupture analyzer (FIG. 4, 432) can determine the rupture threshold by knowing how many cycles the cell (FIG. 2, 214) was exposed to and the type and quantity of lysing agent (FIG. 2, 216) used. Thus, the rupture analyzer (FIG. 4, 432) determines at what intensity the cell (FIG. 2, 214) ultimately ruptures. With such information on hand, the rupture analyzer (FIG. 4, 432) can determine certain properties of the cell (FIG. 2, 214) including cell type, cell state, etc.

The cell (FIG. 2, 214) is then analyzed (block 606) based on outputs of both the rupture analyzer (FIG. 4, 432) and the lysate analyzer (FIG. 4, 430). That is, rather than just analyzing one characteristic, i.e., lysate information or mechanical property information, both can be analyzed on a single cell (FIG. 2, 214). The dual analysis of a cell (FIG. 2, 214) thus provides more information than would be possible by targeting a single type of information. That is, while a first sample could be tested for mechanical properties and a second sample could be tested for genetic information, inherent differences between the samples may skew results. However, by analyzing both pieces of information from a single sample, an accurate and reliable mapping between mechanical properties, i.e., rupture threshold and lysate properties, may be made. Such a method (600) also promotes sample efficiency by collecting more information from a sample, thus fewer cells (FIG. 2, 214) will be exhausted during a cell (FIG. 2, 214) analysis operation.

FIG. 7 is a diagram of a cell analysis system (420), according to an example of the principles described herein. For simplicity, the controller (FIG. 1, 112) of the cell analysis system (420) is not illustrated in FIG. 7. In the example depicted in FIG. 7, the cell analysis system (420) includes the microfluidic channel (102), ejector (538), waste reservoir (540), cell reservoir (424), and multi well plate (546) described earlier.

In the example depicted in FIG. 7, the chemical lysing device (FIG. 1, 104) rather than including a single lysing chamber (106), includes multiple lysing chambers (106) and multiple corresponding sensors (110-1, 110-2). For simplicity, one instance of a lysing chamber (106) and sensors (110-1, 110-2) are depicted with reference numbers. In this example, each of the multiple sensors (110) may determine if a lysing agent (FIG. 2, 216) disposed through a respective orifice (FIG. 1, 108) ruptures the cell (FIG. 2, 214) membrane. In this example, a downstream lysing agent (FIG. 2, 216) is ejected when it is determined that the cell (214) membrane is not sufficiently lysed from an upstream lysing agent (FIG. 2, 216). That is, rather than exposing a cell (214) to microdroplets from one lysing agent distributor (FIG. 4, 434), the cell (214) may be exposed to microdroplets from different lysing agent distributors (FIG. 4, 428). In some examples, different types or strengths of lysing agent (FIG. 2, 216) are received at different lysing chambers (106). For example, a strength of the lysing agent (FIG. 2, 216) may increase traveling through the microfluidic channel (102) through sequential lysing chambers (106).

Increasing the strength of the lysing agent (FIG. 2, 216) may be performed in a variety of ways. For example, a different type of lysing agent (FIG. 2, 216) may be used. In another example, the same lysing agent (FIG. 2, 216) may be used, but in a different concentration that increases the effects of the lysing agent (FIG. 2, 216). As the lysing agent (FIG. 2, 216) distributed into the different lysing chambers (106) is different, the system (100) includes multiple agent reservoirs (426-1, 426-2, 426-3), each holding the different lysing agent (FIG. 2, 216).

FIG. 7 also depicts an example where the chemical lysing device (FIG. 1, 104) is disposed on the same microfluidic die (536) as the cell reservoir (424) and the lysing agent reservoirs (422). In this example, the lysing agent distributor (FIG. 4, 428) rather than being an ejector may be a pump or some other mechanism to move the lysing agent (FIG. 2, 216) through a channel towards the chemical lysing device (FIG. 1, 104). In this example, the lysate (FIG. 2, 218) is ejected directly into the wells of the microwell plate (546).

Note that while FIG. 7 depicts multiple lysing chambers (106) in an example where the lysing agent distributor (FIG. 4, 428) is a pump, multiple lysing chambers (106) may also be used in an example where the lysing agent distributors (FIG. 4, 428) are ejectors. In this example, each lysing chamber (106) would include a corresponding orifice (FIG. 1, 108).

FIG. 8 is a diagram of a cell analysis device (420), according to an example of the principles described herein. In the example depicted in FIG. 8, the cell analysis system (420) includes the microfluidic channel (102), lysis chamber (106), sensors (110), ejector (538), waste reservoir (540), microfluidic die (536) that includes the lysing agent distributor (FIG. 4, 428) and the agent reservoir (426).

In the example depicted in FIG. 8, however, the cell reservoir (424) is disposed on the chip (544) in which the chemical lysing device (FIG. 1, 104) and the microfluidic channel (102) are disposed in. That is, in this example, the agent reservoir (426) is disposed on a different substrate than the substrate on which the cell reservoir (424) and cell analysis device (FIG. 4, 422) are formed.

FIG. 8 also depicts an example where the chemical lysis device (FIG. 1, 104) includes a cell presence sensor (848) to detect the presence of a cell (214) to be lysed. The cell presence sensor (848) may trigger activation of the lysing agent distributors (FIG. 4, 428) based on a detected presence of a cell (214) in a respective lysing chamber (106). The cell presence sensor (848) may be of any variety of types such as those described as examples of sensors (110). That is, the cell presence sensor (848) may be an impedance sensor, an optical scatter sensor, an optical fluorescence sensor, an optical bright field imaging system, an optical dark field imaging system, or a thermal property sensor. This cell presence sensor (848) is disposed before the lysing chamber (106). If the cell presence sensor (848) sends information to the controller (FIG. 1, 112) which indicates that a cell (214) is not present, the component controller (FIG. 4, 434) may avoid activating the lysing agent distributor (FIG. 4, 428). By comparison, if the cell presence sensor (848) sends information to the controller (FIG. 1, 112) which indicates that a cell (214) is present, the component controller (FIG. 4, 434) may activate the lysing agent distributor (FIG. 4, 428). By so doing, the chemical lysis device (FIG. 1, 104) preserves lysing agent (216) as the lysing agent (216) is not continually, or haphazardly ejected, but ejected at times when a cell (214) is determined to be positioned within the lysing chambers (106). Doing so also ensures that lysing agent (216) is completely and uniformly distributed over the cell (214) to be lysed.

Figure 9:
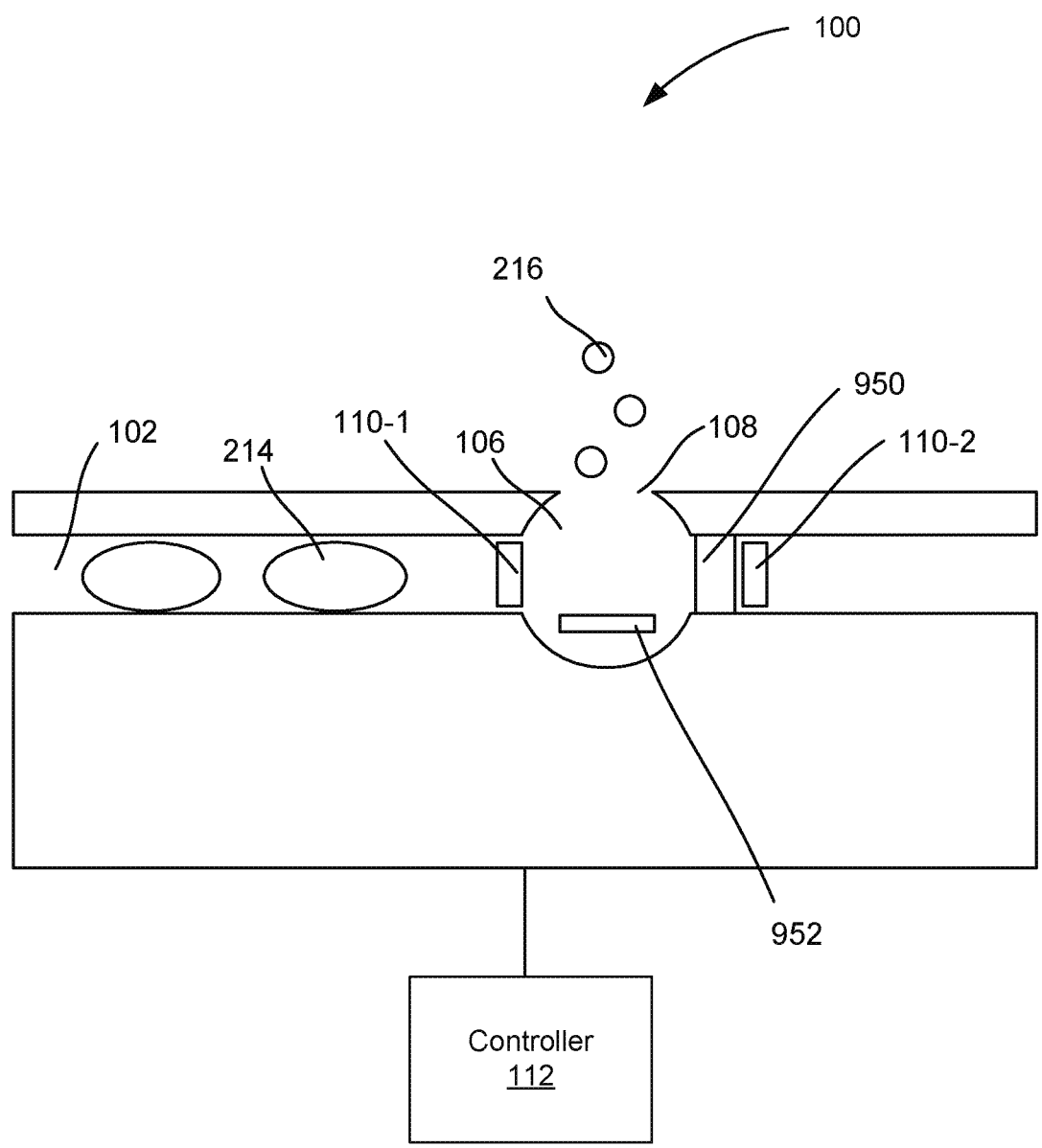
FIG. 9 is a diagram of a chemical lysis system, according to an example of the principles described herein.

FIG. 9 is a diagram of a chemical lysis system (100), according to an example of the principles described herein. Specifically, FIG. 9 depicts an example where the chemical lysing device (FIG. 1, 104) includes additional components. First, each chemical lysing device (FIG. 1, 104) may include a blocking structure (950) downstream of the at least one lysing chamber (106) to hold a cell (214) until the cell (214) membrane ruptures. In some examples, the blocking structure (950) may be a mesh filter with pores smaller than the cell (214), but bigger than the individual components of the lysate (FIG. 2, 218). Accordingly, a cell (214) may not pass and therefore remains in the lysing chamber (106) during lysis. Once the cell (214) is lysed, the cell (214) membrane breaks down releasing the smaller components of the lysate (FIG. 2, 218). These smaller components may pass through the blocking structure (950) for downstream operation, such as ejection out of the ejector (FIG. 5, 538). Such a filter provides another quality control over the lysing operation. That is, the blocking structure (950) prevents un-lysed cells (214) from passing through. Thus, an operator can have confidence in knowing that anything ejected through the ejector (FIG. 5, 538) towards a downstream analysis system, is in fact a lysate (FIG. 2, 218) as intended and not an intact, un-lysed cells (214).

In the example depicted in FIG. 9, each lysis chamber (106) also includes retaining electrodes (952) disposed within each lysing chamber (106) to retain a cell (214) during lysis. Additional detail regarding the retaining electrodes (952) is presented below in connection with FIGS. 10A-10C.

Figure 10A:
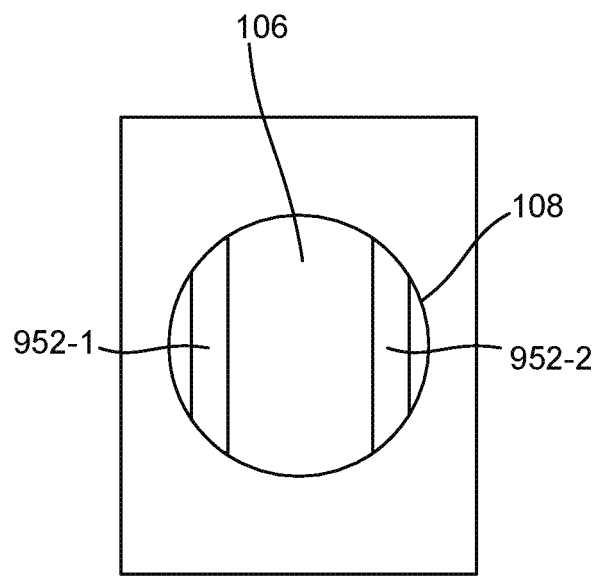
FIGS. 10A-10C are diagrams of a lysing chamber, according to an example of the principles described herein.
Figure 10B:
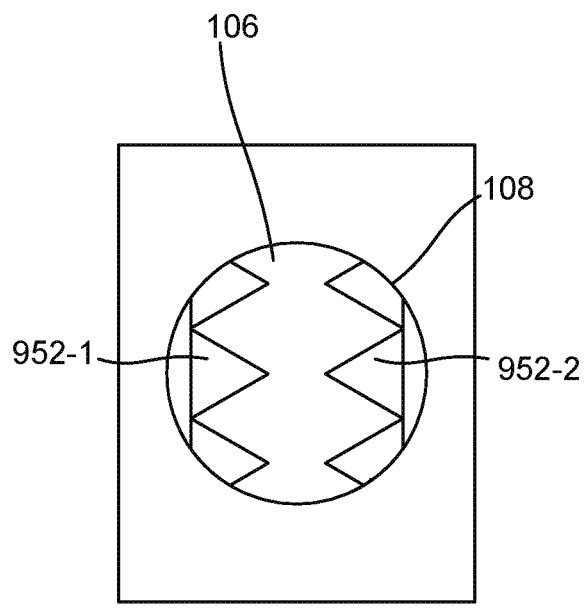
Figure 10C:
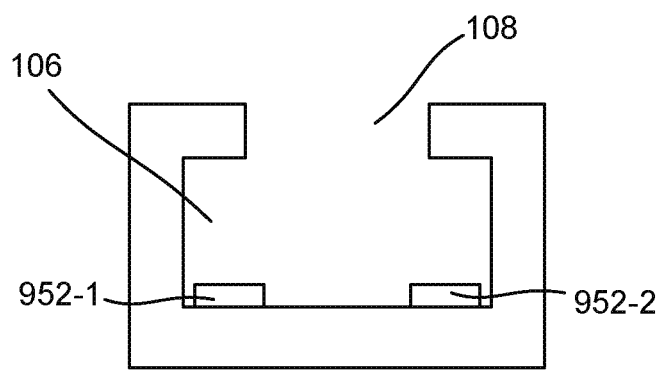

FIGS. 10A-10C are diagrams of a lysing chamber (106), according to an example of the principles described herein. Specifically, FIGS. 10A and 10B are top down views through the orifice (108) and FIG. 10C is a cross-sectional diagram. As described above, the retaining electrodes (952-1, 952-2) hold the cells (FIG. 2, 214) in place during lysis. FIGS. 10A and 10B depict different shape of retaining electrodes (952-1, 952-2). The retaining electrodes (952-1, 952-2) generate a non-uniform electric field within the lysing chamber (106). As with all particles, the cells (214) exhibit a dielectrophoretic effect where the cell (214) is polarized. Accordingly, when in the non-uniform electric field, or field gradient, generated by the electrodes (952-1, 952-2), one end of a cell (214) is attracted to one of the retaining electrodes (952) and another end of the cell (214) is attracted to the other retaining electrode (952). Thus, the cell (214) is held in place due to the polar nature of a cell (214) and the non-uniform electrodes (952) each attracting a particular end of the cell (214).

In summary, using such a chemical lysis system 1) provides for effective monitoring of cell lysis on a per-cell basis; 2) ensures sufficient lysis without degradation to cell contents; 3) provides control of the amount of analyte to be delivered downstream; 4) identifies subsets of cell population that are difficult to lyse; 5) provides a feedback signal for automated control of the lysis operation, 6) allows combined cell analysis, i.e., a genetic analysis and a mechanical property analysis; 7) can be integrated onto a lab-on-a-chip; 8) is scalable and can be parallelized for high throughput, 9) is low cost and effective, and 10) reduces the contamination of the sample, in particular by the lysing agent on the lysate. However, the devices disclosed herein may address other matters and deficiencies in a number of technical areas.

What is claimed is:

1. A chemical lysis system, comprising:
    a microfluidic channel to serially feed individual cells from a volume of cells to at least one chemical lysing device, each chemical lysing device comprising:
        at least one lysing chamber to receive, from the microfluidic channel, a single cell to be lysed;
        an orifice disposed in each lysing chamber to receive a lysing agent; and
        a sensor to detect a conductivity within the lysing chamber; and
    a controller to:
        responsive to determining the conductivity within the lysing chamber exceeds a conductivity threshold, determine the single cell is ruptured;
        determine an amount of the lysing agent used to rupture the cell;
        identify a value of the conductivity within the lysing chamber exceeding the conductivity threshold and used to determine the cell ruptured; and
        generate a rupture threshold indicating an intensity with which the cell ruptures based on the determined amount of the lysing agent and the identified value of the conductivity within the lysing chamber.

2. The chemical lysis system of claim 1, wherein the controller is to determine when a cell membrane has ruptured based on an output of the sensor.

3. The chemical lysis system of claim 1, further comprising a lysing agent distributor to introduce the lysing agent through the orifice to rupture a cell membrane.

4. The chemical lysis system of claim 3, wherein the lysing agent distributor is formed in a different microfluidic die than a microfluidic die which houses the microfluidic channel and at least one chemical lysing device.

5. The chemical lysis system of claim 1, wherein the microfluidic channel and at least one chemical lysing device are disposed on a substrate separate from a substrate on which a cell reservoir is disposed.

6. The chemical lysis system of claim 1, wherein:
the chemical lysing device comprises:
- multiple lysing chambers;
- multiple orifices; and
- multiple corresponding sensors;

each of the multiple sensors is to determine if a lysing agent introduced through a respective orifice ruptures the cell membrane; and wherein different types or strengths of lysing agent are received through different orifices.

7. The chemical lysis system of claim 1, wherein each chemical lysing device comprises at least one of:
- a blocking structure downstream of the at least one lysing chamber to hold a cell until the cell membrane ruptures;
- retaining electrodes disposed within each lysing chamber to retain a cell during lysis;
- an ejector to eject a lysate of a ruptured cell; and
- a waste reservoir to collect waste fluid.

* * * * *